(12) United States Patent
Kwon et al.

(10) Patent No.: US 11,967,952 B2
(45) Date of Patent: *Apr. 23, 2024

(54) ELECTRONIC SYSTEM INCLUDING FPGA AND OPERATION METHOD THEREOF

(71) Applicant: Samsung Electronics Co., Ltd., Suwon-si (KR)

(72) Inventors: Hyungdal Kwon, Ansan-si (KR); Seungwook Lee, Suwon-si (KR); Youngnam Hwang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

This patent is subject to a terminal disclaimer.

(21) Appl. No.: 17/242,737

(22) Filed: Apr. 28, 2021

(65) Prior Publication Data

US 2021/0250028 A1 Aug. 12, 2021

Related U.S. Application Data

(63) Continuation of application No. 16/802,927, filed on Feb. 27, 2020, now Pat. No. 11,012,075.

(30) Foreign Application Priority Data

Jun. 4, 2019 (KR) .................. 10-2019-0066132

(51) Int. Cl.
*G06F 30/327* (2020.01)
*H03K 19/1776* (2020.01)

(52) U.S. Cl.
CPC ....... *H03K 19/1776* (2013.01); *G06F 30/327* (2020.01)

(58) Field of Classification Search
CPC ........ G06F 30/30; G06F 2111/02; G06F 8/20; G06F 8/34; G06F 2115/10; G06F 30/33;
(Continued)

(56) References Cited

U.S. PATENT DOCUMENTS 5,841,674 A 11/1998 Johannsen
6,058,492 A 5/2000 Sample et al.
(Continued)

FOREIGN PATENT DOCUMENTS

CN 1372193 A 10/2002
CN 1985256 A 6/2007
(Continued)

OTHER PUBLICATIONS

Office Action dated Aug. 16, 2023 in Chinese Application No. 202010297936.0.

*Primary Examiner* — Binh C Tat
(74) *Attorney, Agent, or Firm* — HARNESS, DICKEY & PIERCE, P.L.C.

(57) ABSTRACT

An electronic system and an operation method thereof are disclosed. A method of an electronic system including a field programmable gate array (FPGA) includes: synthesizing, by processing circuitry, code of a high level language into code of a hardware description language; designing, by the processing circuitry, a circuit of an intellectual property (IP) block included in the field programmable gate array according to the code of the hardware description language; and generating, by the processing circuitry, a database containing reference assembly code corresponding to the code of the high level language and information about a circuit configuration of the intellectual property block.

20 Claims, 13 Drawing Sheets

(58) Field of Classification Search
CPC .. G06F 30/333; G06F 9/4494; G06F 2111/20; G06F 3/013; G06F 16/212; G06F 16/26; G06F 2111/04; G06F 2111/10; G06F 2111/12; G06F 2119/18; G06F 3/048; G06F 30/13; G06F 30/34; G06F 9/44; G06F 8/41; G06F 8/53; G06F 30/327; G06F 30/331; G06F 9/3897; G06F 3/0481; G06F 11/273; G06F 15/7867; G06F 16/951; G06F 16/9538; G06F 16/957; G06F 16/9577; G06F 16/958; G06F 3/0482; G06F 3/0484; G06F 3/04847; G06F 40/106; G06F 40/109; G06F 40/14; G06F 40/151; G06F 40/186; G06F 40/197; G06F 9/3455; G06F 12/0862; G06F 12/0875; G06F 15/7814; G06F 9/30047; G06F 9/30076; G06F 9/3877; G06F 2117/08; G06F 3/011; G06F 3/016; G06F 3/04815; G06F 3/147; G06F 3/167; G06F 9/4411; G06F 11/263; G06F 12/084; G06F 15/80; G06F 2115/08; G06F 2212/452; G06F 40/137; G06F 9/3001; G06F 9/30145; G06F 9/30181; G06F 9/3802; G06F 1/3287; G06F 1/3293; G06F 15/76; G06F 15/78; G06F 30/20; G06F 30/3308; G06F 30/343; G06F 30/39; G06F 40/103; G06F 9/30014; G06F 9/30036; G06F 11/261; G06F 30/3323; G06F 30/337; G06F 9/3005; G06F 9/3016; G06F 9/3017; G06F 9/30185; G06F 9/3818; G06F 9/383; G06F 9/3834; G06F 9/3836; G06F 9/3838; G06F 9/3851; G06F 9/3855; G06F 9/3857; G06F 9/3873; G06F 9/3885; G06F 9/3889; G06F 11/267; G06F 11/362; G06F 11/3644; G06F 16/2365; G06F 16/2379; G06F 16/245; G06F 16/90335; G06F 16/9535; G06F 16/986; G06F 17/16; G06F 18/213; G06F 21/105; G06F 21/32; G06F 21/552; G06F 21/554; G06F 2111/06; G06F 2115/06; G06F 2221/034; G06F 2221/0713; G06F 2221/2115; G06F 3/0488; G06F 30/00; G06F 30/35; G06F 30/396; G06F 30/398; G06F 40/169; G06F 40/30; G06F 7/4876; G06F 7/499; G06F 8/48; G06F 8/49; G06F 9/30134; G06F 9/4843; G06F 9/54; G06F 9/4451; G06F 21/1015; G06F 30/323; G06F 9/3856; G06F 9/3858; G06F 30/347; G06F 40/20; G06F 3/0487; G06F 18/24; G06F 11/27; G06F 18/214; G06F 16/58; G06F 16/907; G06F 18/217; G06F 18/23; G06F 18/23211; G06F 18/2415; G06F 18/2431; G06F 7/535; G06F 9/0076; G06F 16/71; G06F 16/784; G06F 21/76; G06F 13/1668; G06F 21/575; G06F 21/577; G06F 2119/12; G06F 1/206; G06F 1/3225; G06F 1/3275; G06F 11/3058; G06F 11/3409; G06F 11/3476; G06F 11/3692; G06F 13/4068; G06F 13/42; G06F 16/2455; G06F 16/27; G06F 17/13; G06F 18/2148; G06F 18/2155; G06F 21/55; G06F 21/56; G06F 21/562; G06F 21/565; G06F 21/566; G06F 21/567; G06F 21/568; G06F 21/572; G06F 21/71; G06F 21/72; G06F 21/75; G06F 2115/02; G06F 2119/06; G06F 2201/81; G06F 30/15; G06F 30/392; G06F 8/30; G06F 8/36; G06F 8/63; G06F 8/658; G06F 9/44521; G06F 9/449; G06F 11/3656; G06F 12/0246; G06F 16/285; G06F 16/743; G06F 16/7867; G06F 18/24143; G06F 21/31; G06F 21/44; G06F 21/64; G06F 21/79; G06F 21/85; G06F 2221/0751; G06F 30/27; G06F 30/31; G06F 30/3312; G06F 30/394; G06F 40/166; G06F 40/171; G06F 40/284; G06F 8/447; G06F 8/65; G06F 9/4401; G06F 9/4406; G06F 9/4416; G06F 9/44505; G06F 9/4893; G10L 19/16; G10L 13/033; G10L 13/047; G10L 13/00; G10L 13/027; G10L 13/08; G10L 13/10; G10L 15/02; G10L 2013/105; G10L 2015/025; G10L 21/10; G06N 5/025; G06N 20/00; G06N 3/08; G06N 3/048; H01L 27/118

USPC .................................................. 716/100–106

See application file for complete search history.

(56) References Cited

U.S. PATENT DOCUMENTS

| 6,081,473 | A | 6/2000 | Agrawal et al. |
| 7,240,303 | B1* | 7/2007 | Schubert ................. G06F 30/33 703/15 |
| 7,356,672 | B2 | 4/2008 | Vahid et al. |
| 7,827,510 | B1* | 11/2010 | Schubert ............... G06F 30/331 716/111 |
| 7,992,110 | B1 | 8/2011 | Yuan et al. |
| 8,015,395 | B1 | 9/2011 | Lewis et al. |
| 8,041,551 | B1 | 10/2011 | Pakyari et al. |
| 8,547,136 | B1 | 10/2013 | Guilloteau |
| 8,601,413 | B2 | 12/2013 | Yasunaka |
| 8,856,708 | B1 | 10/2014 | Lillestolen |
| 8,930,922 | B2 | 1/2015 | Metzgen |
| 9,633,158 | B1 | 4/2017 | Jones et al. |
| 9,716,503 | B2 | 7/2017 | Wang et al. |
| 9,922,150 | B1 | 3/2018 | Yiannacouras et al. |
| 10,546,087 | B1 | 1/2020 | Lee et al. |
| 11,012,075 | B2* | 5/2021 | Kwon ................... G06F 30/343 |
| 2006/0005173 | A1* | 1/2006 | Eng .......................... G06F 30/30 717/140 |
| 2008/0028357 | A1 | 1/2008 | Shimony |
| 2011/0225557 | A1 | 9/2011 | Fujita |
| 2012/0036138 | A1 | 2/2012 | Carrion |
| 2018/0246997 | A1 | 8/2018 | Yasunaka |
| 2019/0095566 | A1* | 3/2019 | Denisenko ............... G06F 8/427 |
| 2019/0205144 | A1* | 7/2019 | Zhang .................... G06F 3/0611 |

FOREIGN PATENT DOCUMENTS

| CN | 101763280 A | 6/2010 |
| CN | 102163248 A | 8/2011 |
| CN | 103324511 A | 9/2013 |
| CN | 110352400 A | 10/2019 |
| JP | 2008-282360 A | 11/2008 |
| JP | 2018-041129 A | 3/2018 |

* cited by examiner

| APP_ID | Thread ID, eFPGA ID, Loading Time, IP Run Time, Start Time, End Time, Area, Clock Frequency, Power Gating, IP Power CPU Run Time, GPU Run Time, DSP Run Time, CPU Power, GPU Power, DSP Power |
|---|---|

ELECTRONIC SYSTEM INCLUDING FPGA AND OPERATION METHOD THEREOF

CROSS-REFERENCE TO RELATED APPLICATION

This application is a continuation of U.S. application Ser. No. 16/802,927, filed on Feb. 27, 2020, which claims the benefit of Korean Patent Application No. 10-2019-0066132, filed on Jun. 4, 2019, in the Korean Intellectual Property Office, the disclosure of each of which is incorporated herein in its entirety by reference.

BACKGROUND

Some example embodiments of the present disclosure relate to memory systems and an operation methods thereof, and more particularly, to memory systems including a field programmable gate array (FPGA) and operation methods thereof.

Some of the factors that may influence the performance of electronic systems are a capacity and a processing amount of a main memory or a system memory and an access speed thereto. A plurality of function blocks may share limited resources. Accordingly, allocation of resources to an unnecessary function block, which a user does not use, may cause a decrease in a total system speed and/or an increase in system power consumption.

SUMMARY

Some example embodiments of the present disclosure relate to electronic systems, such as memory systems including field programmable gate arrays (FPGAs) and operation methods thereof.

According to some example embodiments of some inventive concepts, there is provided an operation method of an electronic system including a field programmable gate array (FPGA), the operation method including: synthesizing, by processing circuitry, code of a high level language into code of a hardware description language; designing, by the processing circuitry, a circuit of an intellectual property (IP) block included in the FPGA based on the code of the hardware description language; and generating, by the processing circuitry, a database containing reference assembly code corresponding to the code of the high level language and information about a circuit configuration of the IP block.

According to some example embodiments of some inventive concepts, there is provided an electronic system including a field programmable gate array (FPGA), the electronic system including: processing circuitry configured to synthesize code of a high level language into code of a hardware description language; the FPGA including at least one Intellectual Property (IP) block having a circuit configuration designed based on an access result of the processor to the high level synthesis program; and a storage device storing a database containing reference assembly code corresponding to the code of the high level language and information about the circuit configuration of the IP block.

According to some example embodiments of some inventive concepts, there is provided an operation method of an electronic system including a field programmable gate array (FPGA), the operation method including: selecting, by processing circuitry, first code and second code from code corresponding to a plurality of tasks to be processed by the electronic system; converting, by the processing circuitry, the first code and the second code into code of hardware description languages, respectively; loading, by the processing circuitry, a first Intellectual property (IP) block in a first sub-array of the FPGA according to the code of the hardware description language into which the first code is converted; and loading, by the processing circuitry, a second IP block in a second sub-array of the FPGA according to the code of the hardware description language into which the second code is converted.

BRIEF DESCRIPTION OF THE DRAWINGS

Some example embodiments of some inventive concepts will be more clearly understood from the following detailed description taken in conjunction with the accompanying drawings in which.

DETAILED DESCRIPTION OF THE EMBODIMENTS

Figure 1:
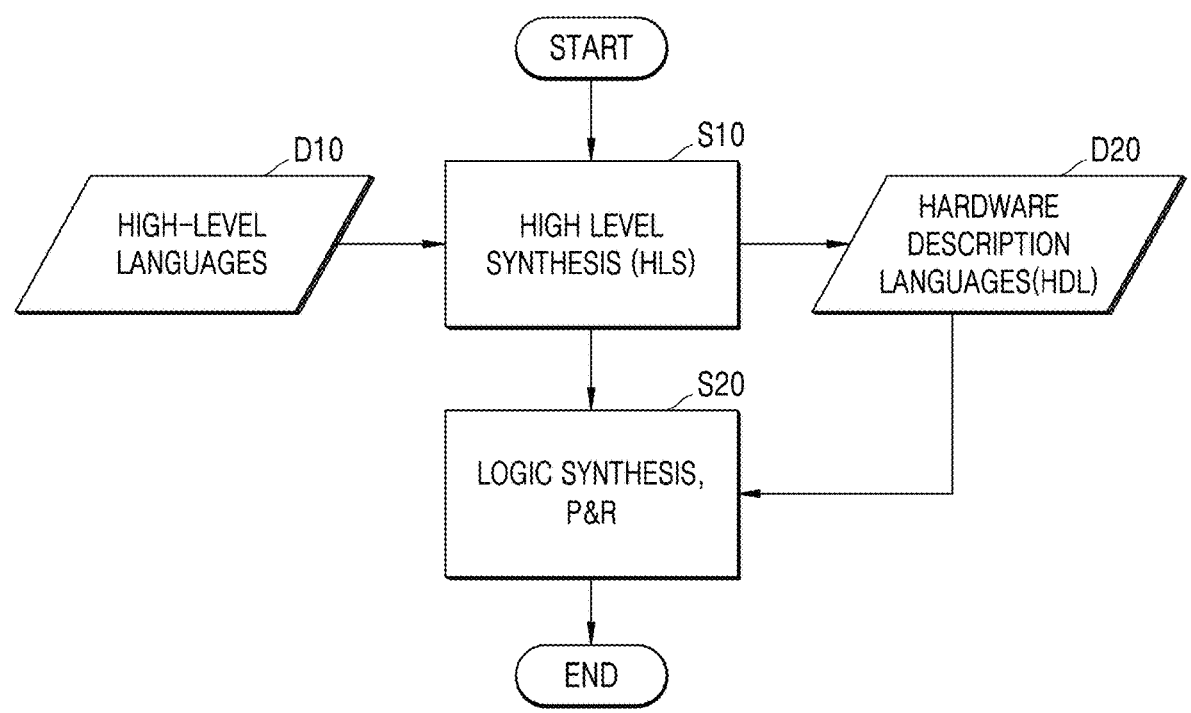
FIG. 1 is a flowchart of an operation of an electronic system, according to some example embodiments of the present disclosure.

FIG. 1 is a flowchart of an operation of an electronic system, according to some example embodiments of the present disclosure, and is a flowchart of a method of changing an internal logic circuit structure by using a high level synthesis (HLS) program. For example, the electronic system may be applied to a smartphone, a smart TV, a medical device, a mobile device, an image display device, an instrumentation device, an Internet of Things (IoT) device, a robot device such as a drone or an advanced drivers assistance system (ADAS), or the like and/or may be mounted on one of various types of electronic systems.

Referring to FIG. 1, in operation S10, the electronic system may perform an HLS operation of converting pieces of code D10 described with high level languages into pieces of code D20 described with hardware description languages (HDLs). For example, the HLS operation may be performed when processing circuitry (e.g., 220 of FIG. 3A) executes a level synthesis program.

For example, the high level language may be C language, C++ language, or the like but is not limited thereto. For example, the HDL may be Verilog, very high-speed integrated circuit (VHSIC) hardware description language (VHDL), or the like. Herein, the pieces of code D20 described with HDLs may have an abstract form of a behavior of an integrated circuit, e.g., may be defined in a register transfer level (RTL).

According to some example embodiments, the electronic system may perform operation S10 after converting code of a high level language that may be difficult to be converted into an HDL, into code of another high level language that may be converted into the HDL.

According to some example embodiments, the electronic system may further include a component capable of performing a neural network operation. The electronic system may be configured perform a neural network operation by using input data and output data of a function including code of a high level language that may be difficult to be converted into an HDL, and convert the function into a function of another high level language that may be converted into the HDL, according to an operation result derived through the neural network operation. For example, it may be difficult to convert a recursive function into code of an HDL. The processing circuitry may be configured to convert input data and output data of the recursive function into a function including code of a high level language that may be converted into an HDL, through a neural network operation and perform operation S10 based on the converted code of the high level language.

According to some example embodiments, the electronic system may further include a component capable of performing a deep learning process. The electronic system may be configured to perform a deep learning process on a function including code of a high level language that may be converted into an HDL. Based on a result of performing the deep learning process, a function including code of a high level language that is difficult to be converted into an HDL may be converted into a function including code of another high level language that can be converted into the HDL. For example, the electronic system may convert a recursive function into a function including code of a high level language that may be converted into an HDL, through a deep learning process and perform operation S10 based on the converted code of the high level language.

According to some example embodiments, processing circuitry 220 of the electronic system may be configured to perform operation S10 after converting specific code described with a high level language into another code of a high level language based on a prediction that converting the specific code into an HDL may be computationally intensive, that is, may involve an expenditure of significant computational resources. For example, the processing circuitry 220 of the electronic system may be configured to perform operation S10 after converting at least some pieces of code for floating-point operations, which are included in specific code of a high level language, into pieces of code for fixed-point operations. The processing circuitry 220 may be configured to reduce errors which may occur according to the conversion into pieces of code for a fixed point by adjusting a bit width of the pieces of code for the fixed point.

In operation S20, the processing circuitry 220 of an electronic system may perform a logic synthesis operation and a placement and routing (P&R) operation by using the pieces of code D20 described with the HDLs. The logic synthesis operation and the P&R operation may be performed by processing circuitry 220 accessing a logic synthesis program and a P&R program, respectively. The logic synthesis operation performed by the processing circuitry 220 may generate a netlist by converting the pieces of code D2 described with the HDLs into a hardware form including logic gates. The P&R operation performed by the processing circuitry 220 may place and route the converted logic gates. According to the execution of operation S20, the processing circuitry 220 may be configured to change a circuit structure of a reconfigurable logic device included in the electronic system. For example, the processing circuitry 220 may be configured to change a hardware structure of a reconfigurable logic device included in a field programmable gate array (FPGA).

Although FIG. 1 separately shows operation S10 and operation S20 in which the operations as illustrated are distinct, the present disclosure is not limited to example embodiments in which operations S10 and S20 are clearly separated and executed by the processing circuitry as two independent operations. According to some example embodiments, the HLS operation may include both operations S10 and S20, that is, both creating a circuit structure by receiving an input of the pieces of code D10 described with high level languages and changing the circuit structure by applying logic synthesis thereto.

According to some example embodiments, processing circuitry 220 of an electronic system may be configured to receive an input of a high level language and perform synthesis up to a logic gate level, and thus, a user may easily design and modify an FPGA by using a high level language without directly using an HDL.

Figure 2:
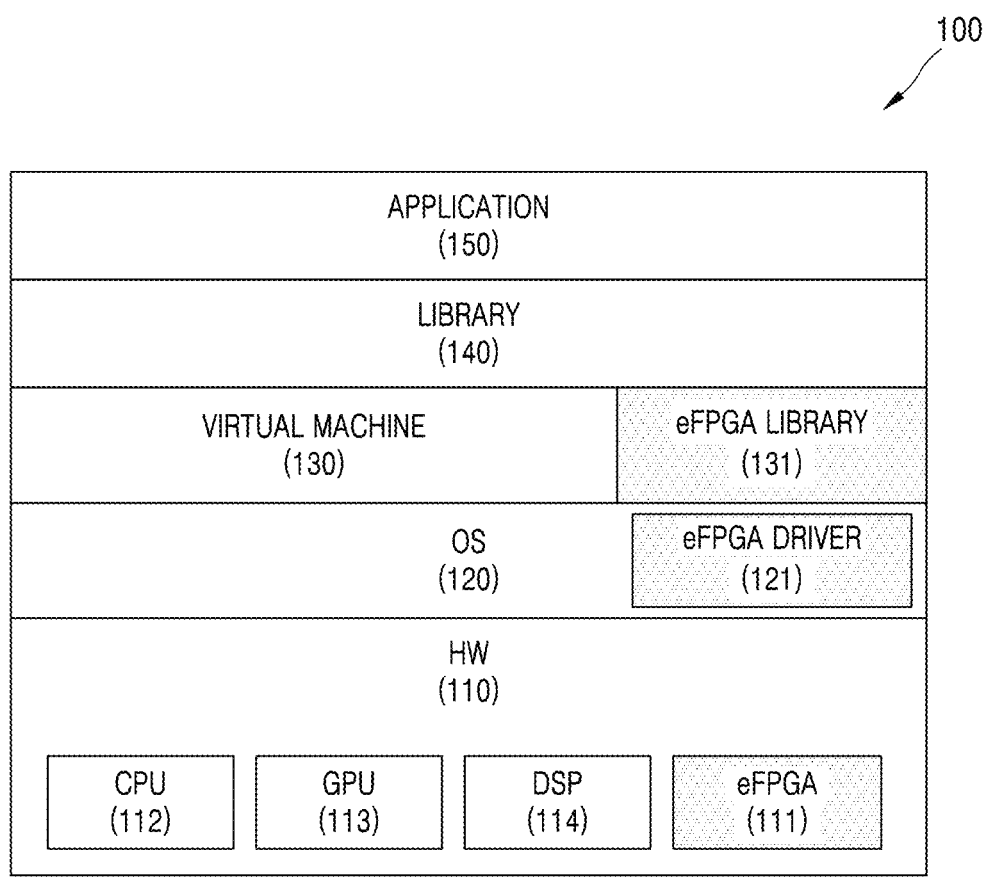
FIG. 2 is a block diagram of an architecture of an electronic system, according to some example embodiments of the present disclosure.

FIG. 2 is a block diagram of an architecture of an electronic system, according to some example embodiments of the present disclosure.

Referring to FIG. 2, a system architecture 100 may include hardware (HW) 110, an operating system (OS) 120, a virtual machine (VM) 130, a library 140, and/or an application 150. The OS 120, the VM 130, the library 140, and/or the application 150 may be organized as a software stack and may be stored in a memory 230 of FIG. 3A.

The HW 110 may include processing circuitry (e.g., 220 of FIG. 3A) such as a central processing unit (CPU) 112, a graphics processing unit (GPU) 113, a digital signal processor (DSP) 114, and the like, a memory (e.g., 230 of FIG. 3A) including read only memory (ROM), random access memory (RAM), and the like, a storage device including a hard disk drive (HDD), a solid state drive (SSD), and the like, and other peripheral devices. In addition, the HW 110 may include an embedded FPGA (eFPGA) 111. However, some other example embodiments of electronic systems according to the present disclosure are not limited to the example shown in or described with reference to FIG. 2

The processing circuitry 220 executing the OS 120 may be configured to operate the electronic system, such as controlling the HW 110, supporting execution of the application 150 and the like. For example, the processing circuitry 220 executing the OS 120 may be configured to receive a task request from the application 150, set a series of tasks for processing requested tasks, and/or allocate the tasks to the HW 110. In addition, the processing circuitry 220 executing the OS 120 may be configured to transmit, to the application 150, a result obtained by executing the series of tasks processed using the HW 110.

According to some example embodiments, the OS 120 may be an OS such as Apple's macOS™, Microsoft Windows™, UNIX™, or Linux™, or an OS specified to a mobile device, such as Apple's iOS™, or Google's Android™, but the scope of some example embodiments according to the present disclosure is not limited the above examples.

The processing circuitry 220 executing the VM 130 may be configured to implement a computing environment by using software, and/or may be software configured to emulate a computer. The OS 120 or the application 150 may be installed and installed on the VM 130. For example, the VM 130 may include a Java™ VM configured to execute Java™ byte code.

According to some example embodiments, the processing circuitry 220 of an electronic system may be configured to design an eFPGA 111 such that the HW 110 processes at least some pieces of code to be executed by the VM 130. In this case, an eFPGA sub-system may include the eFPGA 111, an eFPGA device driver 121, and/or an eFPGA library 131, and the eFPGA device driver 121 and/or the eFPGA library 131 may be configured to support the eFPGA 111.

When code (e.g., byte code) is analyzed and/or executed by using the VM 130, a processing speed may decrease. Therefore, processing circuitry 220 of some electronic system according to some example embodiments of the present disclosure may be configured to design the eFPGA 111 such that at least some pieces of code to be executed by the VM 130 are processed by the HW 110 by applying hardware acceleration thereto. Some example embodiments may exhibit improved processing speed due to the use of the FPGA in such a manner.

The library 140 may, for example, provide a function which the application 150 needs, or provide various functions to the application 150 such that the application 150 can use limited resources inside the electronic system. According to some example embodiments, the library 140 may include a GPU library and a DSP library, and the GPU library and the DSP library may provide functions needed when the GPU 113 and the DSP 114 process tasks according to the application 150, respectively.

According to some example embodiments, the electronic system may further include a component capable of performing a neural network operation and/or a component capable of performing a deep learning process. The component capable of performing a neural network operation and/or the component capable of performing a deep learning process may be included in the software stack but are not limited thereto, and the component capable of performing a neural network operation and the component capable of performing a deep learning process may be included as hardware in the electronic system.

Figure 3A:
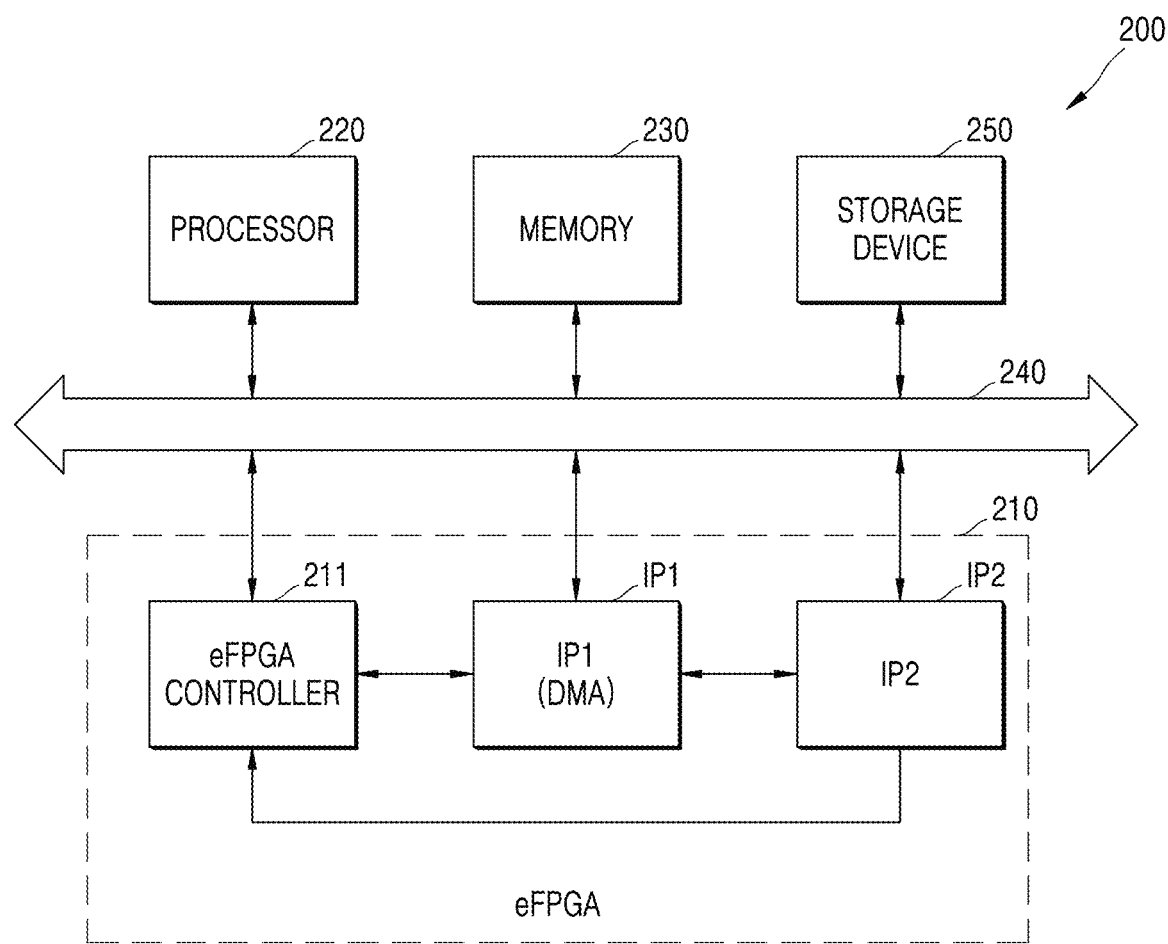
FIGS. 3A and 3B are block diagrams of electronic systems according to some example embodiments of the present disclosure.
Figure 3B:
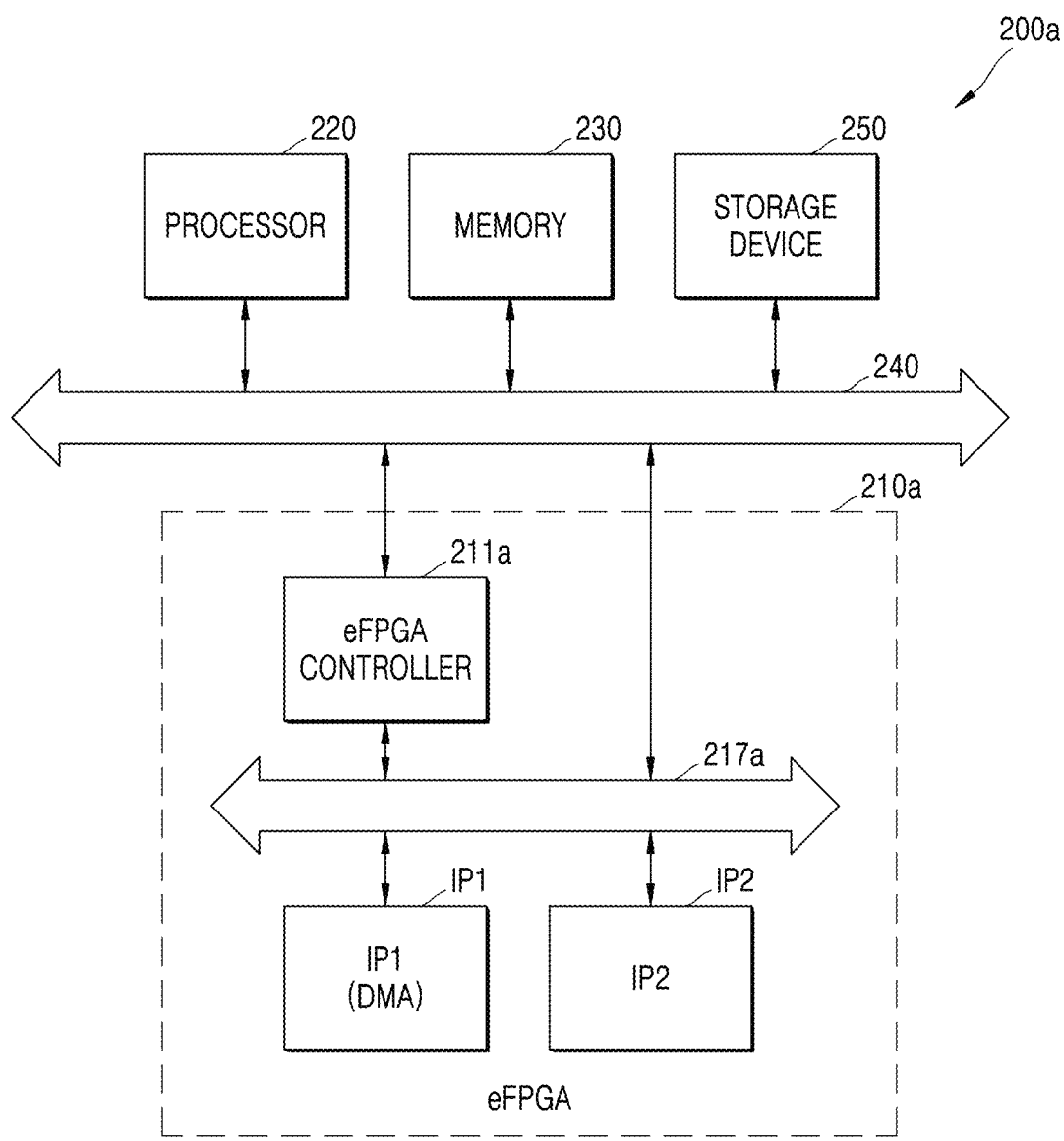

FIGS. 3A and 3B are block diagrams of electronic systems according to some example embodiments of the present disclosure Referring to FIG. 3A, an example embodiment of an electronic system 200 may include an eFPGA 210, processing circuitry 220, and a memory 230. The eFPGA 210, the processing circuitry 220, and the memory 230 may be connected to each other through a system bus 240.

In some example embodiments, the processing circuitry 220 may include hardware such as logic circuits; a hardware/software combination, such as a processor executing software; or a combination thereof. For example, a processor may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry 220 may correspond to the CPU 112, the GPU 113, and the DSP 114 of FIG. 2. That is, the processing circuitry 220 may include at least one core capable of executing a random instruction set (e.g., Intel architecture-32 (IA-32), 64-bit extension IA-32, x86-64, PowerPC, Sparc, microprocessor without interlocked pipeline stages (MIPS), advanced reduced instruction set computer (RISC) machine (ARM), IA-64, or the like). The processing circuitry 220 may be configured to access the memory 230 through the system bus 240 and/or to execute instructions stored in the memory 230. For example, the memory 230 may be configured to store an HLS program, a logic synthesis program, and/or a P&R program, and the processing circuitry 220 may be configured to execute the HLS program, the logic synthesis program, and/or the P&R program to perform operations S10 and S20 of FIG. 1.

Some example embodiments may include memory 230, such as a storage storing instructions, data, and the like and may store, for example, an OS, various kinds of programs, and/or various kinds of data. The memory 230 may be dynamic random access memory (DRAM) but is not limited thereto. The memory 230 may include at least one of a volatile memory and/or a non-volatile memory. The non-volatile memory may include ROM, programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), ferroelectric RAM (FRAM), and the like. The volatile memory may include DRAM, static RAM (SRAM), synchronous DRAM (SDRAM), and the like. In addition, according to some example embodiments, the memory 230 may include at least one of an HDD, an SSD, a compact flash (CF) card, a secure digital (SD) card, a micro-SD card, a mini-SD card, an extreme digital (xD) card, or a memory stick.

In some example embodiments, the eFPGA 210 may include an eFPGA controller 211 and/or at least one intellectual property (IP) block. The eFPGA 210 may be the eFPGA 111 of FIG. 2. The eFPGA controller 211 may be configured to implement IP blocks in sub-eFPGAs (also referred to as "sub-arrays" of the eFPGA), each including a reconfigurable logic device, in response to an IP block loading command when the IP block loading command is received. Each of the sub-eFPGAs may include logic cells, and/or according to a characteristic of an IP block, the number of logic cells to be used may vary, and/or a connection relationship among the logic cells may vary.

For example, in some example embodiments, the eFPGA 210 may include a first IP block IP1 and a second IP block IP2. Each of the first IP block IP1 and the second IP block IP2 may be implemented as hardware, e.g., as a specific circuit, by an HLS operation (e.g., operation S10 of FIG. 1). According to some example embodiments, the first IP block IP1 and/or the second IP block IP2 may be implemented in different sub-eFPGAs, respectively, and/or may be individually connected to the system bus 240. That is, the first IP block IP1 and the second IP block IP2 may be configured to individually transmit and/or receive data through the system bus 240. However, the present disclosure is not limited thereto, and in some other example embodiments, the first IP block IP1 and the second IP block IP2 may be implemented in a same sub-eFPGA.

The eFPGA 210 may include various types of IP blocks. For example, in some example embodiments, the IP blocks may include at least one of a processing unit, a plurality of cores included in a processing unit, a multi-format codec (MFC), a video module (e.g., a camera interface, a Joint Photographic Experts Group (JPEG) processor, a video processor, a mixer, or the like), a three-dimensional (3D) graphic core, an audio system, a driver, a display driver, a volatile memory, a non-volatile memory, a memory controller, an input and output interface block, and/or a cache memory. Each of the first IP block IP1 and the second IP block IP2 may include at least one of the various types of IP blocks.

According to some example embodiments, the electronic system 200 may be configured to apply hardware acceleration to frequently used commands about memory read/write. That is, the first IP block IP1 of the eFPGA 210 may be designed, synthesized, and/or configured to operate as a direct memory access (DMA). For example, as the number of times of memory read/write by functions related to memory read/write, such as memcpy, strncpy, malloc, and calloc, increases, execution using a memory-related IP block such as the DMA may improve the read/write performance more than direct execution using the processing circuitry 220, thereby reducing power consumption. In addition, when the first IP block IP1 of the eFPGA 210 is designed, synthesized, and/or configured to additionally perform simple operations such as addition, division, multiplication, subtraction, and the like in addition to a DMA function, the performance of the first IP block IP1 of the eFPGA 210 may be further improved as compared with direct execution in the processing circuitry 220. According to an example embodiment, the processing circuitry 220 may be configured to calculate a time to be taken to change a circuit configuration of the eFPGA 210 such that the circuit configuration of the eFPGA 210 corresponds to a DMA and a time to be taken for the eFPGA 210 to perform an operation of the DMA. Based on the calculated times being less than a time to be taken for the processing circuitry 220 to perform the operation of the DMA, the processing circuitry 220 may be configured to change a circuit configuration of the first IP block IP1 of the eFPGA 210 such that the circuit configuration of the first IP block IP1 of the eFPGA 210 corresponds to the DMA.

The system bus 240 may be configured to use, for example, an advanced microcontroller bus architecture (AMBA) protocol of ARM Holdings as a standard bus. Bus types of the AMBA protocol may include advanced high-performance bus (AHB), advanced peripheral bus (APB), advanced extensible interface (AXI), AXI4, AXI coherency extensions (ACE), and the like. AXI among the bus types described above is an interface protocol between IP blocks and may provide a multiple outstanding address function, a data interleaving function, and the like. In addition, other types of protocols such as uNetwork of SONICs Inc., IBM CoreConnect, and Open Core Protocol of OCP-IP, may be applied to the system bus 240.

In some example embodiments, the electronic system 200 may further include a storage device 250. The storage device 250 may be configured to store various databases needed for the electronic system 200 to operate. For example, the storage device 250 may be configured to store a database (DB) of FIG. 5 and a characteristic table T_ip of FIG. 8.

Referring to FIG. 3B, an example embodiment of an electronic system 200a may include an eFPGA 210a, the processing circuitry 220, and the memory 230. The eFPGA 210a may include an eFPGA bus 217a connecting the eFPGA controller 211a, the first IP block IP1, and the second IP block IP2. For example, the eFPGA bus 217a may be configured to use one of AHB, APB, AXI, AXI4, and ACE as a standard bus but is not limited thereto.

According to some example embodiments, the first IP block IP1 and the second IP block IP2 may be implemented in different sub-eFPGAs, respectively, and/or the first IP block IP1 and the second IP block IP2 may be individually connected to the eFPGA bus 217a. That is, the first IP block IP1 and the second IP block IP2 may be configured to individually transmit and/or receive data through the eFPGA bus 217a. However, the present disclosure is not limited thereto, and in some other example embodiments, the first IP block IP1 and the second IP block IP2 may be implemented in a same sub-eFPGA.

Figure 4:
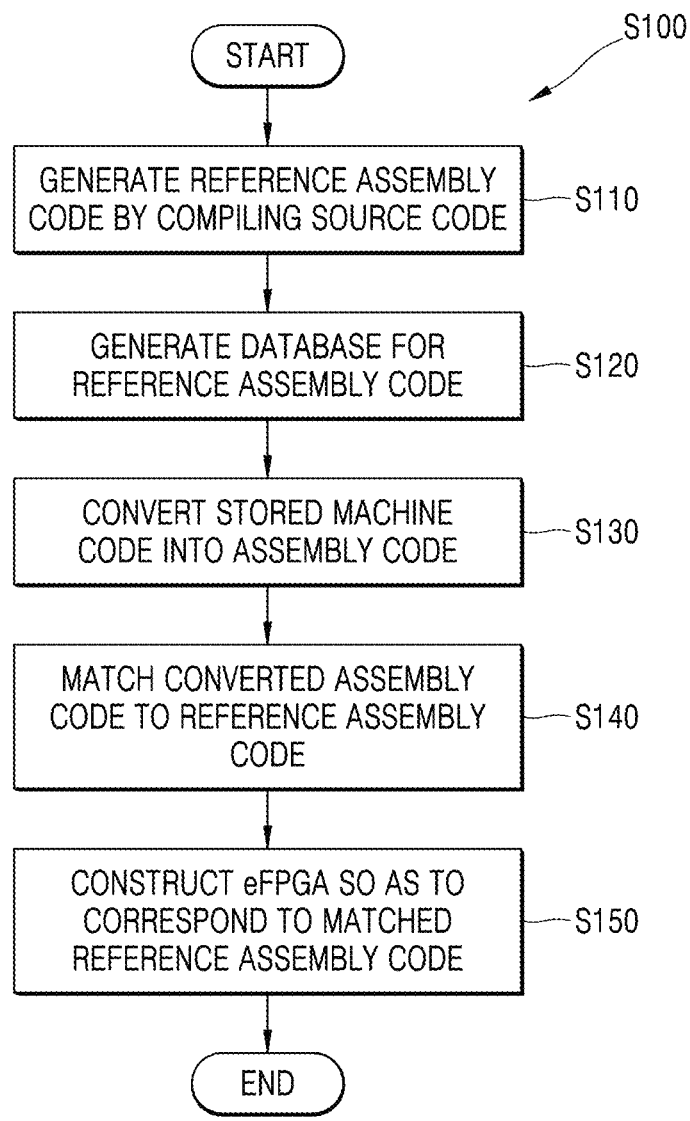
FIG. 4 is a flowchart of an operation of an electronic system, according to some example embodiments of the present disclosure.
Figure 5:
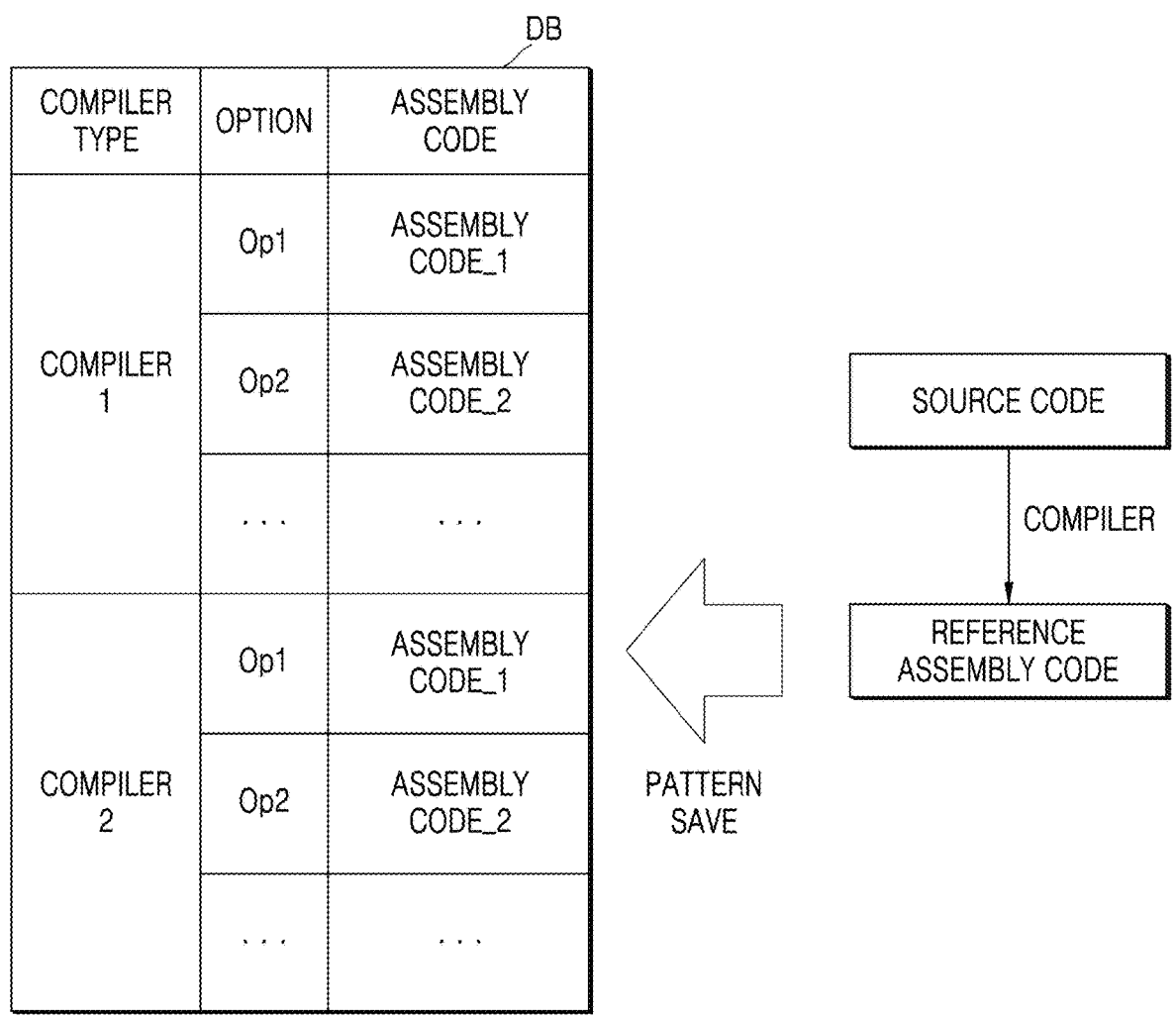
FIGS. 5 and 6 are to describe corresponding operations in FIG. 4.
Figure 6:
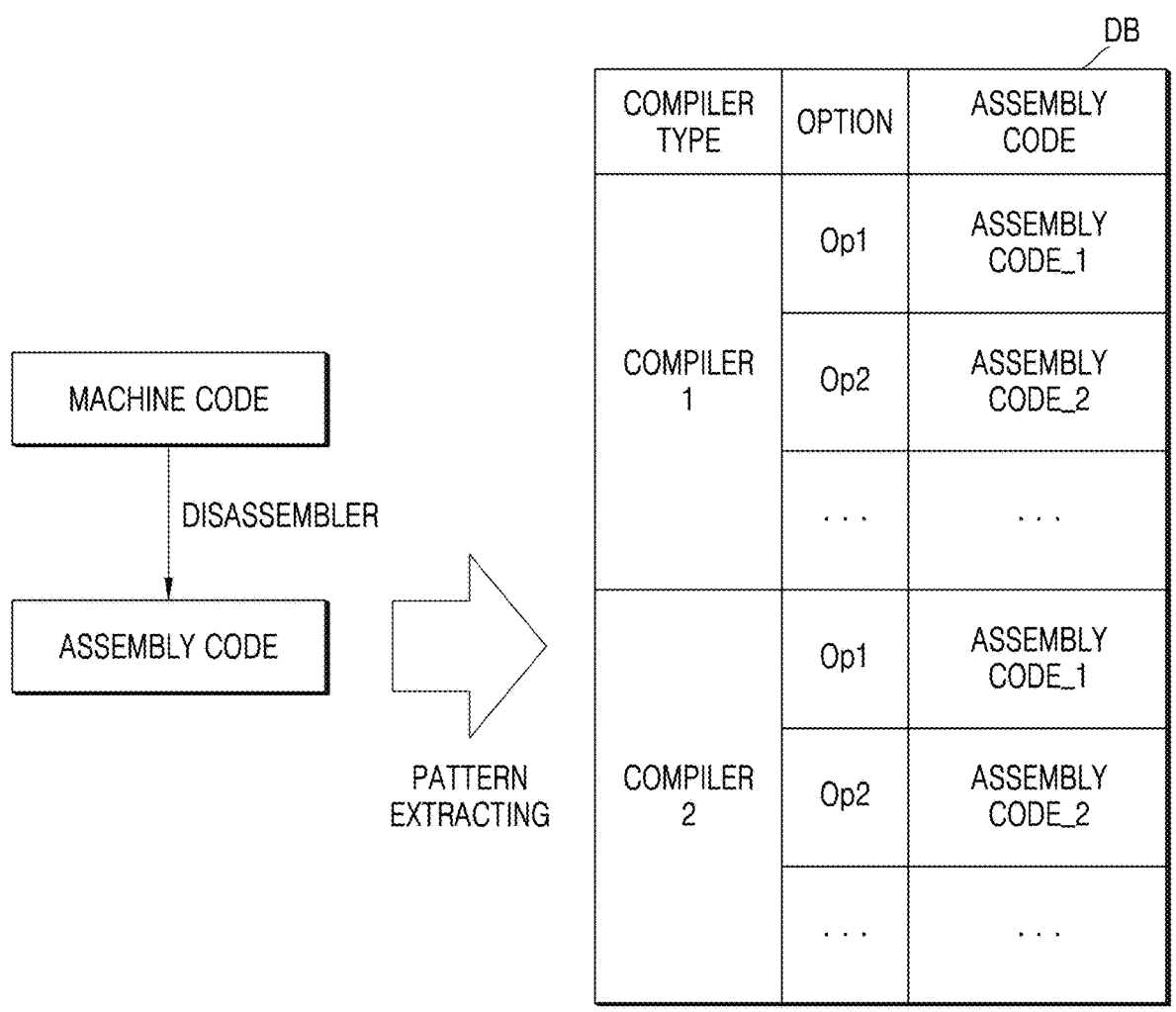

FIG. 4 is a flowchart of an operation of an electronic system, according to some example embodiments of the present disclosure. FIGS. 5 and 6 are to describe corresponding operations in FIG. 4. According to an example embodiment, operation S100 of FIG. 4 may be performed after performing operation S20 of FIG. 1.

Referring to FIGS. 4 and 5, in operation S110, processing circuitry 220 of an electronic system may generate reference assembly code by compiling source code. For example, based on a target circuit configuration determined by performing operation S20 of FIG. 1, the processing circuitry 220 may be configured to compile pieces of code described with high level languages corresponding to the determined target circuit configuration (e.g., the pieces of code D10 of the high level languages in FIG. 1) as the source code by a compiler and converted into the reference assembly code. Herein, according to an example embodiment, the compiler may be software stored in the memory 230 of FIG. 3A, and the processing circuitry 220 may be configured to access the compiler to perform operation S110, but some example embodiments are not limited thereto, and in some other example embodiments, the compiler may be configured as hardware.

According to an example embodiment, the source code may correspond to a specific command that is more advantageous in terms of processing speed and/or power consumption when processed by a reconfigurable logic device implemented as hardware than when processed by the software executed by the processing circuitry 220. For example, as described above in the description of FIG. 3A, frequently used commands memory about memory read/write may be more advantageous in terms of processing speed and/or power consumption when implemented as hardware through hardware acceleration than when executed by a processor.

In operation S120, the processing circuitry 220 of the electronic system may generate a DB for the reference assembly code by storing a pattern of the reference assembly code converted in operation S110. The processing circuitry 220 may be configured to store, in the DB, information about a circuit configuration corresponding to the reference assembly code. For example, the processing circuitry 220 may be configured to store, in the DB, information about a layout of a target circuit corresponding to the reference assembly code, the target circuit being generated in operation S20 of FIG. 1.

In some example embodiments, the processing circuitry 220 may be configured to store the generated DB in a storage device of the electronic system. The converted reference assembly code may vary according to a type (e.g., Compiler1 or Compiler2) of a compiler used for the conversion and an option (e.g., Op1 or Op2) of the compiler. Therefore, based on the reference assembly code being stored in the DB, the processing circuitry 220 may be configured to store information about the type (e.g., Compiler1 or Compiler2) of the compiler and the option (e.g., Op1 or Op2) of the compiler.

Referring to FIGS. 4 and 6, in operation S130, the processing circuitry 220 may convert machine code into assembly code. Herein, the machine code may correspond to a code newly received from the outside, or for example, the processing circuitry 220 may be configured to store machine code by converting assembly code newly received from the outside into new machine code by an assembler in an operation of storing the newly received assembly code in a memory (e.g., 230 of FIG. 3A) of the electronic system. Alternatively, for example, the processing circuitry 220 may be configured to store the machine code by converting source code newly received from the outside into new machine code by a compiler in an operation of storing the newly received source code in the memory 230 of the electronic system. That is, the processing circuitry 220 may be configured to reconvert the machine code converted and stored in the memory 230 back into the assembly code in operation S130 for operations thereafter. The machine code may include instructions configured to be processed as software by the processing circuitry 220.

In operation S140, the processing circuitry 220 may match the converted assembly code to the reference assembly code stored in the DB. The processing circuitry 220 may be configured to extract the pattern of the assembly code converted in operation S130 and/or to compare the extracted pattern to the reference assembly code stored in the DB.

In some example embodiments, the processing circuitry 220 may be further configured to perform an optimization operation on assembly code converted in operation S130, such as changing an order of instructions of the assembly code, and consequently the assembly code may not be one-to-one matched to the reference assembly code stored in the DB. According to some example embodiments, the processing circuitry 220 may be configured to extract assembly code associated with an instruction being currently performed by excluding assembly code not associated with the instruction being currently performed and/or to match the extracted assembly code to the reference assembly code stored in the DB. For example, the processing circuitry 220 may be configured to determine an association with the instruction being currently performed based on information about an accessed register, a memory address, and the like.

In operation S150, the processing circuitry 220 may construct a circuit of an eFPGA (e.g., 210 of FIG. 3A) so as to correspond to the matched reference assembly code. That is, an IP block corresponding to the matched reference assembly code may be implemented in the eFPGA 210.

According to some example embodiments, the processing circuitry 220 may be configured to change the circuit of the eFPGA 210 to a circuit configuration corresponding to the matched reference assembly code based on a size of an input/output port of a hardware circuit configuration corresponding to the matched reference assembly code being greater than or equal to a size of an input/output port according to the new machine code. The processing circuitry 220 may be configured to adjust the size of the input/output port according to the new machine code through type casting based on the size of the input/output port of the hardware circuit configuration corresponding to the matched reference assembly code being less than the size of the input/output port according to the new machine code.

According to some example embodiments, the processing circuitry 220 may be configured to check whether input/output data by the circuit of the eFPGA 210 designed in operation S150 matches input/output data based on the machine code operating as software by being processed by the processing circuitry 220. Based on the input/output data not matching each other, the processing circuitry 220 may be configured to perform operations S140 and S150 again.

In some example embodiments, the electronic system according to the present disclosure may include the DB, even though operations S10 and S20 shown in FIG. 1 may not be directly performed on condition that the machine code corresponds to the code newly received from the outside, and/or the processing circuitry 220 may be configured to change the circuit configuration of the eFPGA 210 through matching to the reference assembly code stored in the DB. Therefore, a time to be taken to change the circuit configuration of the eFPGA 210 to process, by the eFPGA 210, a task to be processed as software by the processor may be reduced.

In addition, based on a compiled binary file being downloaded to operate a new application in the electronic system, the processing circuitry 220 may be configured to compare a file including a set of instructions stored in the binary file to the DB and/or to analyze the file in an assembly language level. Based on tasks according to a new application being processed through such an analysis, the processing circuitry 220 may be configured to determine whether the tasks are processed as software through the processing circuitry 220, or as hardware by constructing the eFPGA 210 so as to correspond to the new application.

Figures 7, 8:
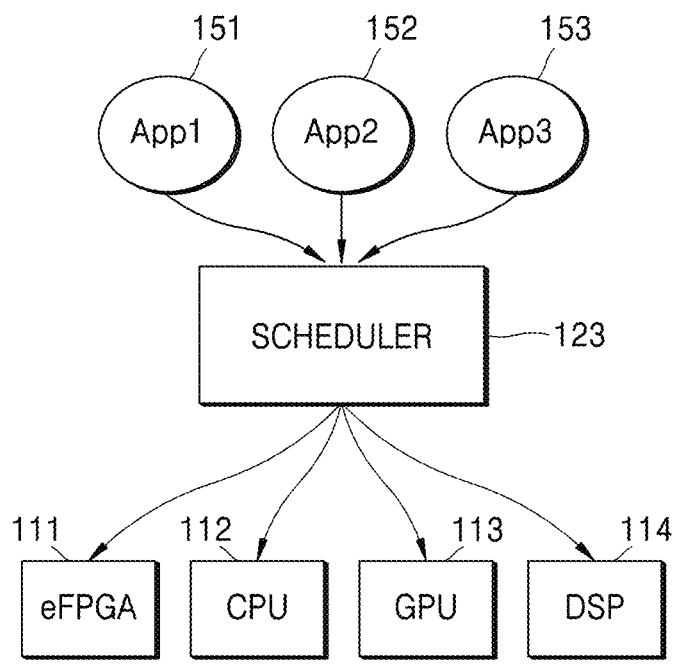
FIG. 7 is to describe an operation of a scheduler of an electronic system, according to some example embodiments of the present disclosure.
FIG. 8 is a characteristic table in which characteristics are stored when an application is processed by intellectual property (IP) blocks loaded in an embedded field programmable gate array (eFPGA) of the electronic system, according to some example embodiments of the present disclosure.
Figure 9:
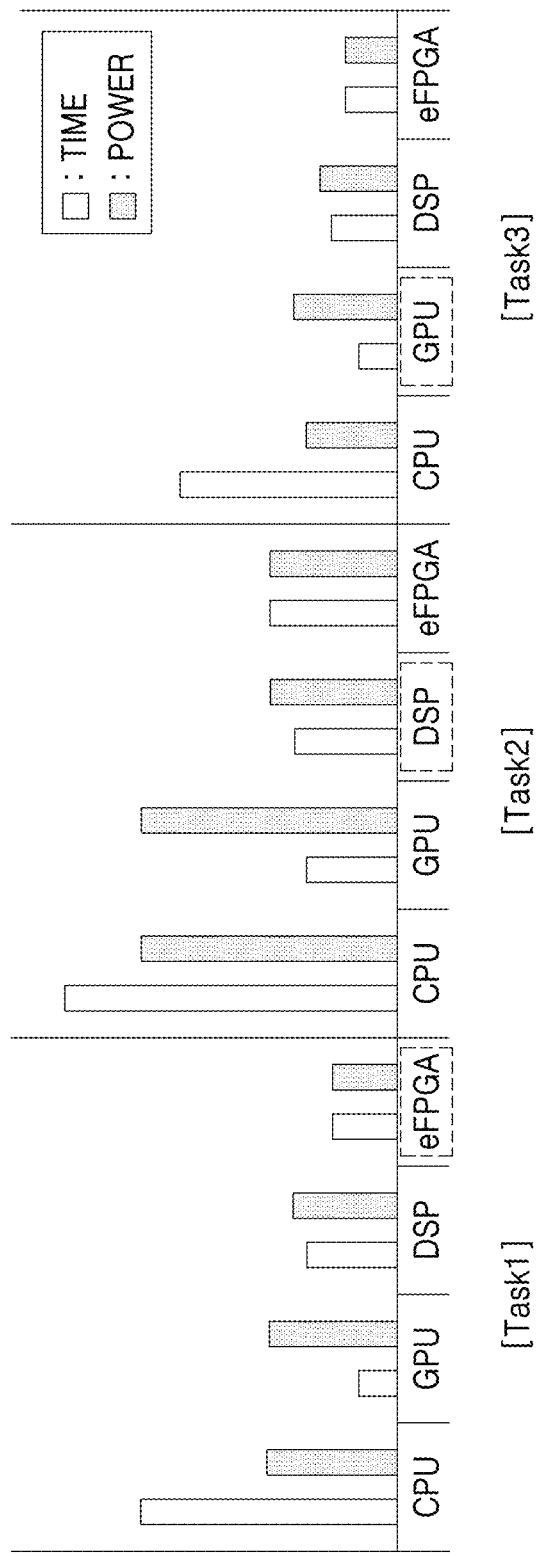
FIG. 9 is a graph showing characteristics when tasks are respectively processed by different pieces of hardware of the electronic system, according to some example embodiments of the present disclosure.

FIG. 7 is to describe an operation of a scheduler that may be used by processing circuitry of an electronic system, according to some example embodiments of the present disclosure. FIG. 8 is a characteristic table in which characteristics are stored when an application is processed by IP blocks loaded in an eFPGA of the electronic system, according to some example embodiments of the present disclosure. FIG. 9 is a graph showing characteristics of tasks that may be respectively processed by different pieces of hardware of the electronic system, according to some example embodiments of the present disclosure.

Referring to FIGS. 7 and 8, the processing circuitry 220 of an electronic system may include a scheduler 123. The scheduler 123 may allocate, by the processing circuitry 220, tasks to different pieces of hardware. The scheduler 123 may allocate, by the processing circuitry 220, a plurality of tasks, e.g., respective tasks according to a first application 151, a second application 152, and a third application 153, to the CPU 112, the GPU 113, the DSP 114, and the eFPGA 111 based on the characteristic table T_ip. According to an example embodiment, the scheduler 123 may be software as a portion of the OS 120 of FIG. 2, may be stored in the memory 230 of FIG. 3A, and may operate in response to an access of the processing circuitry 220. However, the present disclosure is not limited thereto, and in some example embodiments, the scheduler 123 may be hardware.

According to an example embodiment, the characteristic table T_ip may include information about characteristics of IP blocks of the eFPGA 111 implemented as hardware by an HLS operation (e.g., operation S10 of FIG. 1). The characteristic table T_ip may include information about characteristics of IP blocks implemented as hardware according to operation S20 of FIG. 1.

For example, the characteristic table T_ip may include information about a thread identifier (ID) of an application, which corresponds to an ID of the application (APP ID), an ID of an eFPGA, a loading time, a run time of an IP block, an operation start time, an operation end time, an area of resources which the IP block uses, an operation clock frequency of the IP block, whether power gating of the IP block is performed/enabled, and/or power consumption of the IP block.

The processing circuitry 220 may be configured to use an ID of the eFPGA 111 to identify a sub-eFPGA in which an IP block is to be loaded, and/or to indicate or determine the loading time based on a time to be taken to load the IP block in the eFPGA 111. The run time of the IP block may be a time to be taken for the IP block to perform tasks according to the application, and the operation start time and the operation end time may indicate a start time and an end time of an operation of the IP block, respectively. The area of resources which the IP block uses may include the number of resources which the IP block has used in the eFPGA 111, i.e., the number of used logic cells, the number of used RAMs, a size of input/output ports, and the like. The operation clock frequency of the IP block may indicate a frequency of a proper clock signal in an operation of the IP block, and whether power gating of the IP block is performed/enabled may indicate whether a power gating operation on power provided to the IP block is being performed or whether a power gating operation on power provided to the IP block is enabled. The power consumption of the IP block may indicate power to be consumed to process tasks of a specific application.

In addition, the characteristic table T_ip may further include information about the CPU 112, the GPU 113, and the DSP 114 corresponding to the ID of the application (APP ID) in addition to the information about the IP block of the eFPGA 111. For example, information about a time to be taken for each of the CPU 112, the GPU 113, and the DSP 114 to process the tasks of the specific application and information about power to be consumed for each of the CPU 112, the GPU 113, and the DSP 114 to process the tasks of the specific application may be stored in the characteristic table T_ip.

According to some example embodiments, the processing circuitry 220 of an electronic system may further include a profiler, and the pieces of information stored in the characteristic table T_ip may be stored by the profiler. For example, the profiler of the processing circuitry 220 may include a CPU profiler, a GPU profiler, a DSP profiler, and an eFPGA profiler. The CPU profiler, the GPU profiler, the DSP profiler, and the eFPGA profiler may measure, by the processing circuitry 220, times taken and power consumed by the CPU 112, the GPU 113, the DSP 114, and the eFPGA 111 to perform tasks, respectively, and information about the times required and power consumption may be stored in the characteristic table T_ip. According to an example embodiment, the profiler may be implemented as software, but the present disclosure is not limited thereto, and the profiler may be implemented as hardware.

Referring to FIGS. 7 to 9, the scheduler 123 may calculate, by the processing circuitry 220 and based on the characteristic table T_ip, times to be taken and/or power to be consumed by the CPU 112, the GPU 113, the DSP 114, and the eFPGA 111 to process a first task, a second task, and a third task that are at least some of tasks according to the first application 151, the second application 152, and the third application 153. According to some example embodiments, based on the first application 151, the second application 152, and the third application 153 being frequently executed by various electronic systems, the processing circuitry 220 may be configured to share a calculated result with different electronic systems through cloud computing.

The scheduler 123 may select, by processing circuitry 220, an advantageous (e.g., optimal) combination to process each of the first task, the second task, and/or the third task among the CPU 112, the GPU 113, the DSP 114, and the eFPGA 111 based on the calculated times required and power consumption when the scheduler 123 performs the first task, the second task, and the third task. For example, the scheduler 123 may allocate, by the processing circuitry, the first task to the eFPGA 111 with both a short time required and low power consumption such that the eFPGA 111 processes the first task; allocate, by the processing circuitry 220, the second task to the DSP 114 with both a short time required and low power consumption such that the DSP 114 processes the second task; and/or allocate, by the processing circuitry 220, the third task to the GPU 113 between the CPU 112 and the GPU 113 except for the eFPGA 111 and the DSP 114, such that the GPU 113 processes the third task. Therefore, the processing circuitry 220 of the electronic system according to the present disclosure may determine whether tasks according to a specific application are processed by software or hardware, by considering a processing speed, power consumption, and the like, and maintain a balance of a work load of each of the CPU 112, the GPU 113, the DSP 114, and the eFPGA 111.

Based on a determination that the eFPGA 111 processes the third task, the processing circuitry 220 of an electronic system may be configured to perform operations S10 and S20 of FIG. 1 to load, in the eFPGA 111, an IP block for processing the third task. Alternatively, based on a determination that the eFPGA 111 processes the third task, the processing circuitry 220 of the electronic system may be configured to perform operations S130 to S150 of FIG. 4 to load, in the eFPGA 111, the IP block for processing the third task. For example, a code corresponding to the third task may be the machine code of FIG. 6, and the processing circuitry 220 of the electronic system may be configured to match reference assembly code stored in a DB (e.g., the DB of FIG. 6) to assembly code converted from the machine code to load, in the eFPGA 111, an IP block of a circuit configuration corresponding to the matched reference assembly code.

Figure 10:
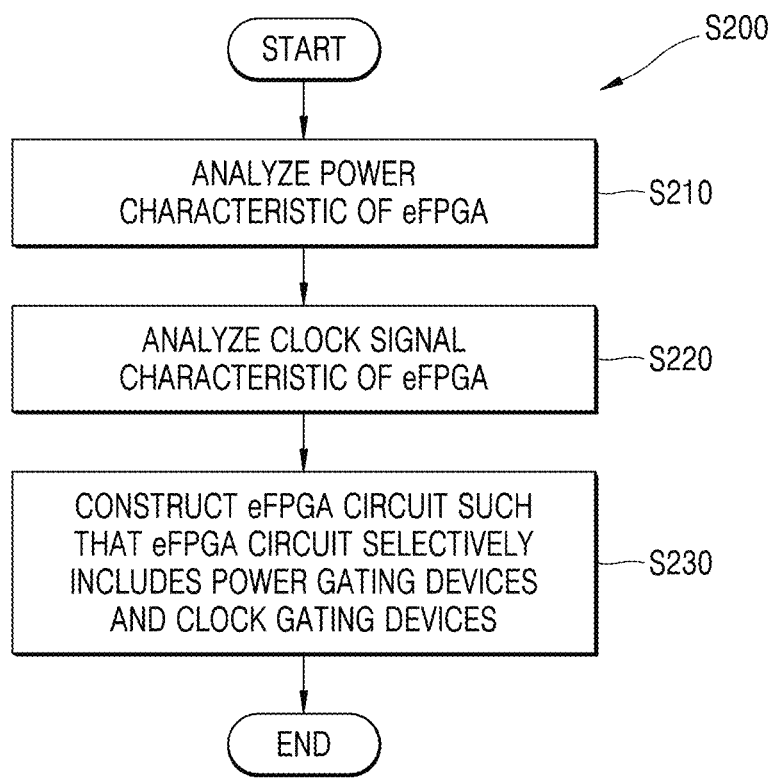
FIG. 10 is a flowchart of an operation of an electronic system, according to some example embodiments of the present disclosure.

FIG. 10 is a flowchart of an operation of an electronic system, according to some example embodiments of the present disclosure. According to some example embodiments, operation S200 of FIG. 10 may be included in operation S20 of FIG. 1 or performed after operation S20 of FIG. 1. According to an example embodiment, operation S200 of FIG. 10 may be included in operation S150 of FIG. 4 or performed after operation S150 of FIG. 4.

Referring to FIG. 10, in operation S210, the processing circuitry 220 of an electronic system may analyze a power characteristic when a designed eFPGA, i.e., an IP block of the eFPGA, performs tasks. For example, the processing circuitry 220 may be configured to analyze and/or determine a period in which the IP block of the eFPGA needs power and a period in which the IP block of the eFPGA does not need power.

In operation S220, the processing circuitry 220 of the electronic system may analyze a characteristic of a clock signal when the designed eFPGA, i.e., the IP block of the eFPGA, performs the tasks. For example, the processing circuitry 220 of the electronic system may be configured to analyze a toggle amount of a flip-flop included in the IP block of the eFPGA and determine whether there is a period in which no toggle occurs. As the toggle amount of the flip-flop increases, the IP block of the eFPGA may need a clock signal of a high frequency.

In operation S230, the processing circuitry 220 of the electronic system may construct a circuit of the eFPGA such that the IP block of the eFPGA selectively includes a power gating device and/or a clock gating device, based on an analysis result. For example, based on a period in which the IP block of the eFPGA needs power being short and a period in which the IP block of the eFPGA does not need power being long, the processing circuitry 220 and/or the eFPGA may be configured to further include the power gating device. Alternatively, for example, based on a period in which no toggle occurs in the flip-flop included in the IP block of the eFPGA, the processing circuitry 220 and/or the eFPGA may be configured to further include the clock gating device.

However, based on persistent power being needed for the IP block of the eFPGA and/or a toggle amount of the flip-flop included in the IP block of the eFPGA being large, the processing circuitry 220 and/or the eFPGA may be configured such that the IP block of the eFPGA includes neither the power gating device nor the clock gating device.

In some example embodiments, the processing circuitry 220 of the electronic system according to the present disclosure may be designed such that power that is unnecessarily consumed in the eFPGA may be reduced, for example, by constructing the processing circuitry 220 and/or the eFPGA so as to selectively include more power the gating device and the clock gating device.

Figure 11A:
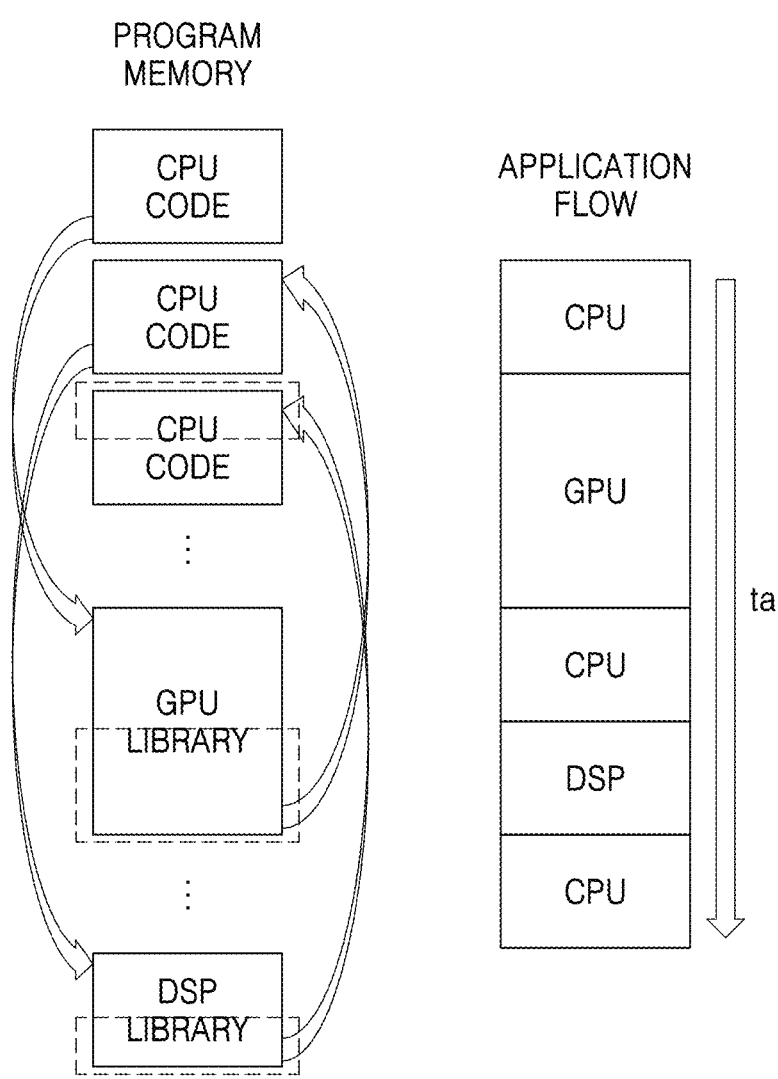
FIGS. 11A and 11B are to describe operations of an electronic system, according to some example embodiments of the present disclosure.
Figure 11B:
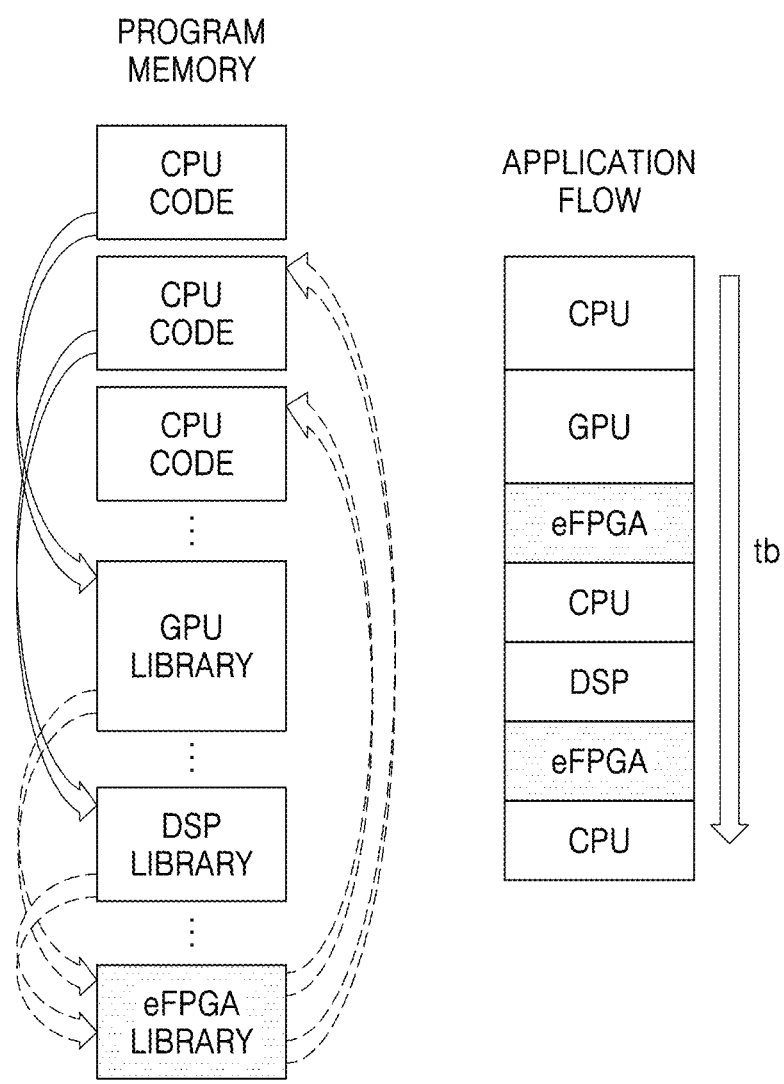

FIGS. 11A and 11B are to describe operations of an electronic system, according to example embodiments of the present disclosure. FIG. 11A shows a case where an application is executed by a CPU, a GPU, and a DSP, and FIG. 11B shows a case where an application is executed by the CPU, the GPU, the DSP, and an eFPGA.

Referring to FIG. 11A, a memory (e.g. 230 of FIG. 3A) may store programs for executing an application. For example, pieces of CPU code, a GPU library, and a DSP library may be stored in the memory 230. Processing circuitry 220 may be configured to execute the application in an order of CPU-GPU-CPU-DSP-CPU by using the pieces of CPU code, the GPU library, and the DSP library.

In this case, the processing circuitry 220 of the electronic system may be configured to determine that at least a portion among the pieces of CPU code, the GPU library, and the DSP library can be implemented as hardware through operations S10 and S20 of FIG. 1. Alternatively, the processing circuitry 220 of the electronic system may be configured to determine that at least a portion among the pieces of CPU code, the GPU library, and the DSP library can be implemented as hardware through operations S130 and S140 of FIG. 4. For example, the processing circuitry 220 may be configured to determine that portions shown with dashed lines can be implemented as hardware.

Referring to FIGS. 11A and 11B, the processing circuitry 220 of the electronic system may be configured to convert at least a portion among the pieces of CPU code, the GPU library, and the DSP library into the eFPGA that is hardware, the at least a portion being determined to enable the same to be implemented as hardware, and/or to execute the application by the eFPGA. According to some example embodiments, based on a determination of an advantage in terms of application processing speed or power consumption according to application processing that the pieces of CPU code, the GPU library, and the DSP library determined to enable the same to be implemented as hardware are performed by the eFPGA implemented as hardware instead of being executed by the CPU, the GPU, and the DSP, the processing circuitry 220 of the electronic system may be configured to convert the at least a portion among the pieces of CPU code, the GPU library, and the DSP library into the eFPGA that is hardware.

An eFPGA library may be stored in the memory 230. The processing circuitry 220 may be configured to execute the application in an order of CPU-GPU-eFPGA-CPU-DSP-eFPGA-CPU by using the pieces of CPU code, the GPU library, the DSP library, and the eFPGA library. An application processing time of using the eFPGA shown in FIG. 11B may be shorter than an application processing time to shown in FIG. 11A.

Figure 12A:
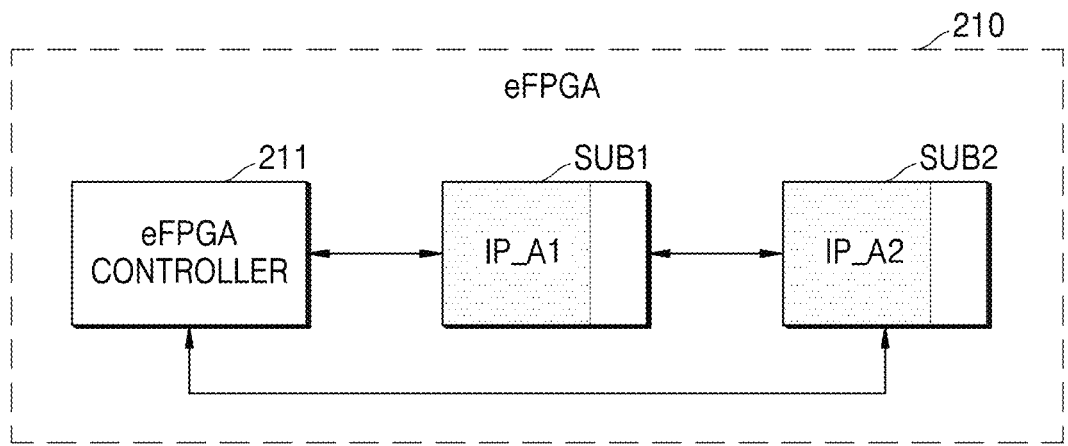
FIGS. 12A and 12B are block diagrams of an eFPGA included in an electronic system, according to some example embodiments of the present disclosure.
Figure 12B:
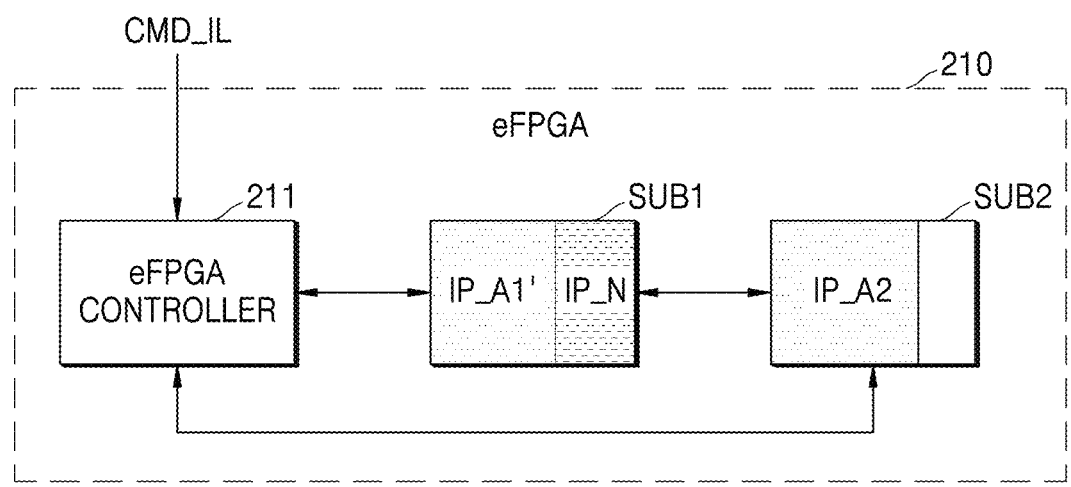

FIGS. 12A and 12B are block diagrams of an eFPGA included in an electronic system, according to some example embodiments of the present disclosure.

Referring to FIG. 12A, the eFPGA 210 may include a first IP block IP_A1 implemented in a first sub-eFPGA SUB1 and a second IP block IP_A2 implemented in a second sub-eFPGA SUB2. For example, the eFPGA may be configured to implement the first IP block IP_A1 in at least a partial region of the first sub-eFPGA SUB1, and/or to implement the second IP block IP_A2 in at least a partial region of the second sub-eFPGA SUB2. That is, each of the first sub-eFPGA SUB1 and the second sub-eFPGA SUB2 may include a plurality of logic cells, the eFPGA may be configured to implement the first IP block IP_A1 based on at least some logic cells among the logic cells included in the first sub-eFPGA SUB1, and/or to implement the second IP block IP_A2 based on at least some logic cells among the logic cells included in the second sub-eFPGA SUB2.

The first sub-eFPGA SUB1 and the second sub-eFPGA SUB2 may be individually connected to a system bus (e.g., 240 of FIG. 3a) or individually connected to an eFPGA bus (e.g., 217a of FIG. 3B).

Referring to FIG. 12B, the eFPGA controller 211 may be configured to implement a new third IP block IP_N in sub-eFPGAs based on an IP block loading command CMD_IL. For example, based on a sub-eFPGA in which no IP block is loaded being determined to exist among sub-eFPGAs included in the eFPGA 210, the eFPGA controller 211 may be configured to implement the new third IP block IP_N in the sub-eFPGA in which no IP block is loaded.

However, according to some example embodiments, based on no sub-eFPGA in which no IP block is loaded being determined to exist among the sub-eFPGAs included in the eFPGA 210, the eFPGA controller 211 may be configured to implement the new third IP block IP_N in a sub-eFPGA having a region in which the new third IP block IP_N is to be implemented among the sub-eFPGAs in which an IP block is loaded, e.g., implement the new third IP block IP_N in the first sub-eFPGA SUB1. Alternatively, according to some example embodiments, the eFPGA controller 211 may be configured to re-implement one or both of the first IP block IP_A1 and the second IP block IP_A2 in another sub-eFPGA. For example, the eFPGA may be configured to re-implement the second IP block IP_A2 in the first sub-eFPGA SUB1, and/or to implement the third IP block IP_N in the second sub-eFPGA SUB2 ensuring a region.

According to some example embodiments, the eFPGA controller 211 may be configured to check a remaining region (e.g., a lookup table (LUT), a flip-flop, RAM, an input and output pad, and the like) in the first sub-eFPGA SUB1 and/or the second sub-eFPGA SUB2 to implement the new third IP block IP_N in a partial region of the first sub-eFPGA SUB1. The processing circuitry 220 of the electronic system may be configured to re-perform an HLS operation on a code corresponding to a circuit configuration of the first IP block IP_A1 based on the remaining region and implement a relatively size-reduced first IP block IP_A1' in the first sub-eFPGA SUB1. The processing circuitry 220 may be configured to implement the new third IP block IP_N in a partial region of the first sub-eFPGA SUB1 remaining, for example, by excluding the region in which the first IP block IP_A1' is implemented. However, some example embodiments of the present disclosure is not limited thereto. According to some other example embodiments, the processing circuitry 220 of the electronic system may be configured to re-perform an HLS operation on code corresponding to the circuit configuration of the first IP block IP_A1 based on the remaining region to improve the performance of the first IP block IP_A1, e.g., to increase a processing speed, and/or to re-implement a relatively size-increased first IP block in the first sub-eFPGA SUB1.

While some inventive concepts have been particularly shown and described with reference to some example embodiments thereof, it will be understood that various changes in form and details may be made therein without departing from the spirit and scope of the following claims.

What is claimed is:

1. An electronic system comprising:
   processing circuitry configured to synthesize code of a high level language into code of a hardware description language;
   a field programmable gate array comprising at least one intellectual property block having a circuit configuration designed according to an access result of executing the code of the high level language; and
   a storage device configured to store information thereon including a database, wherein the processing circuitry is further configured to store reference assembly code corresponding to the code of the high level language, compiler information for the reference assembly code, and information about the circuit configuration of the at least one intellectual property block in the database,
   wherein the processing circuitry is further configured to design a circuit of at least one intellectual property block based on the reference assembly code, and
   wherein the processing circuitry is further configured to convert the code of the high level language into code of another high level language based on determining that the code is unable to be synthesized into the hardware description language, and synthesize the code of the another high level language into the code of the hardware description language.

2. The electronic system of claim 1, wherein the processing circuitry is further configured to classify the reference assembly code according to a type of a compiler configured to convert the code of the high level language into the reference assembly code.

3. The electronic system of claim 1, wherein the processing circuitry is further configured to store, in the storage device, a characteristic table containing information about an operation characteristic of the at least one intellectual property block according to the circuit configuration of the at least one intellectual property block.

4. The electronic system of claim 3, wherein the processing circuitry is further configured to include, in the characteristic table, information about a characteristic of a task corresponding to the circuit configuration of the at least one intellectual property block.

5. The electronic system of claim 4, wherein the processing circuitry is further configured to,
   schedule a plurality of tasks, and
   allocate the plurality of tasks to the field programmable gate array according to the characteristic table.

6. The electronic system of claim 1, wherein
   the field programmable gate array further comprises a first intellectual property block and a second intellectual property block, and
   the first intellectual property block and the second intellectual property block are individually connected to a system bus connecting the processing circuitry and the field programmable gate array.

7. The electronic system of claim 1, wherein
   the field programmable gate array further comprises a first intellectual property block, a second intellectual property block, and a field programmable gate array bus, and
   the first intellectual property block and the second intellectual property block are individually connected to the field programmable gate array bus.

8. The electronic system of claim 1, further comprising:
   a memory storing machine code,
   wherein the processing circuitry is further configured to convert the machine code into assembly code, and match the assembly code to the reference assembly code in the database.

9. The electronic system of claim 8, wherein the machine code corresponds to code configured to execute an application stored in the memory.

10. The electronic system of claim 8, wherein the machine code is executable by a virtual machine.

11. The electronic system of claim 8, wherein the processing circuitry is further configured to match at least one instruction of the assembly code to at least one instruction of the reference assembly code.

12. The electronic system of claim 8, wherein the processing circuitry is further configured to analyze a power characteristic and a clock signal characteristic of a circuit configuration corresponding to the reference assembly code to produce an analysis result, and design the circuit of the intellectual property block to include a power gating device and a clock gating device based on the analysis result.

13. The electronic system of claim 1, wherein the processing circuitry is further configured to determine that the code of the high level language is unable to be synthesized into the code of the hardware description language.

14. An electronic system comprising:
   processing circuitry configured to synthesize code of a high level language into code of a hardware description language; and
   a field programmable gate array comprising a plurality of intellectual property blocks having a circuit configuration designed according to an access result of executing the code of the high level language,
   wherein the processing circuitry is configured to select first code and second code from among code corresponding to a plurality of tasks to be processed, and convert the first code and the second code into code of hardware description languages, respectively,
   wherein the processing circuitry is configured to load a first intellectual property block in a first sub-array of the field programmable gate array based on the code of the hardware description language into which the first code is converted, and load a second intellectual property block in a second sub-array of the field programmable gate array based on the code of the hardware description language into which the second code is converted, and wherein the processing circuitry is further configured to design a circuit of at least one intellectual property block of the plurality of intellectual property blocks.

15. The electronic system of claim 14, wherein the processing circuitry is further configured to convert third code selected from the code corresponding to the plurality of tasks into code of a hardware description language, and load a third intellectual property block in the first sub-array according to the code of the hardware description language into which the third code is converted.

16. The electronic system of claim 15, wherein the processing circuitry is further configured to re-convert the first code into code of a hardware description language, and load, in the first sub-array, an intellectual property block corresponding to the code of the hardware description language into which the first code is re-converted.

17. The electronic system of claim 14, wherein the processing circuitry is further configured to select the first code and the second code is based on an operation speed or power consumption of the first intellectual property block or the second intellectual property block.

18. The electronic system of claim 14, further comprising:
a storage device configured to store a characteristic table containing information about an operation characteristic of the plurality of intellectual property blocks according to the circuit configuration of the plurality of intellectual property blocks.

19. The electronic system of claim 18, wherein the characteristic table further contains information about a characteristic of a task corresponding to the circuit configuration of the plurality of intellectual property blocks.

20. The electronic system of claim 19, wherein the processing circuitry is further configured to,
schedule the plurality of tasks, and
allocate a first task and a second task among the plurality of tasks to the first intellectual property block and the second intellectual property block of the field programmable gate array according to the characteristic table.

* * * * *